US011132817B2

(12) United States Patent
Suda (10) Patent No.: US 11,132,817 B2
(45) Date of Patent: Sep. 28, 2021

(54) IMAGE PROCESSING APPARATUS, IMAGE PROCESSING SYSTEM, AND IMAGE PROCESSING METHOD FOR GENERATING A VEHICLE SEE-THROUGH REAR VIEW IMAGE

(71) Applicant: ALPINE ELECTRONICS, INC., Tokyo (JP)

(72) Inventor: Ryohei Suda, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 9 days.

(21) Appl. No.: 16/833,821

(22) Filed: Mar. 30, 2020

(65) Prior Publication Data
US 2020/0357144 A1 Nov. 12, 2020

(30) Foreign Application Priority Data

May 7, 2019 (JP) .............................. JP2019-087844

(51) Int. Cl.
*B60R 1/00* (2006.01)
*H04N 7/18* (2006.01)
(Continued)

(52) U.S. Cl.
CPC .................. *G06T 7/97* (2017.01); *B60R 1/00* (2013.01); *G06T 7/593* (2017.01);
(Continued)

(58) Field of Classification Search
CPC ............... B60R 1/00; B60R 2300/105; B60R 2300/303; B60R 2300/802;
(Continued)

(56) References Cited

U.S. PATENT DOCUMENTS

| | | | |
|---|---|---|---|
| 8,842,176 B2 * | 9/2014 | Schofield | H04N 7/18 348/113 |
| 2009/0079585 A1 * | 3/2009 | Chinomi | B60R 1/04 340/901 |

(Continued)

FOREIGN PATENT DOCUMENTS

| | | |
|---|---|---|
| GB | 2529408 | 2/2016 |
| GB | 2559758 | 8/2018 |
| JP | 2016-175586 | 10/2016 |

OTHER PUBLICATIONS

M. Menze et al: "Joint 3D Estimation of Vehicles and Scene Flow", ISPRS Annals of Photogrammetry, Remote Sensing and Spatial Information Sciences, vol. II-3/W5, Aug. 20, 2015, pp. 427-434, XP55715039.

(Continued)

*Primary Examiner* — Alison Slater
(74) *Attorney, Agent, or Firm* — IPUSA, PLLC (57) ABSTRACT

An image processing apparatus includes a memory, and a processor coupled to the memory and configured to obtain an image of a first camera disposed on a vehicle such that an imaging range of the first camera includes a portion of a vehicle body and images of a second and third cameras that image an area of a blind spot caused by the portion of the vehicle body, combine a blind spot image corresponding to the area of the blind spot in the image of the second camera with the image of the first camera, obtain three-dimensional information of a rear vehicle with stereo vision of the second and third cameras, and store rear vehicle shape information, wherein the processor determines three-dimensional information corresponding to a portion of the rear vehicle, and combines the blind spot image with the image of the first camera using the determined three-dimensional information.

8 Claims, 10 Drawing Sheets

(51) Int. Cl.
*H04N 5/445* (2011.01)
*H04N 13/00* (2018.01)
*H04N 13/204* (2018.01)
*H04N 5/247* (2006.01)
*G06K 9/78* (2006.01)
*G06T 19/00* (2011.01)
*G06T 7/593* (2017.01)
*G06T 15/20* (2011.01)
*G06T 7/00* (2017.01)
*G06T 7/70* (2017.01)
*G06T 7/73* (2017.01)

(52) U.S. Cl.
CPC ... *B60R 2300/105* (2013.01); *B60R 2300/303* (2013.01); *B60R 2300/802* (2013.01); *G06T 2207/30252* (2013.01)

(58) Field of Classification Search
CPC .... B60R 2300/8046; B60R 2001/1253; B60R 2300/304; B60R 2300/107; G06T 2207/30252; G06T 2207/10028; G06T 2207/10012; G06T 7/593; G06T 7/70; G06T 7/73; G06T 7/174; G06T 7/75
See application file for complete search history.

(56) References Cited

U.S. PATENT DOCUMENTS

2017/0341583 A1* 11/2017 Zhang ................ B60R 1/00
2018/0191954 A1* 7/2018 Pan ................ H04N 13/246
2018/0376124 A1* 12/2018 Zhou ................ G02B 27/14
2019/0026947 A1* 1/2019 Herman ............ B60R 1/00
2019/0355171 A1* 11/2019 Ashley ............ G06T 17/00
2020/0329215 A1* 10/2020 Tsunashima ......... G01C 3/14

OTHER PUBLICATIONS

Rovid A et al: "3D model estimation from multiple images", Fuzzy Systems, IEEE Int. Conf. on Budapest, Hungary Jul. 25-29, 2004., vol. 3, Jul. 25, 2004, pp. 1661-1666, XP010755428.
European Extended Search Report for 20171822.8 dated Jul. 24, 2020.

* cited by examiner

IMAGE PROCESSING APPARATUS, IMAGE PROCESSING SYSTEM, AND IMAGE PROCESSING METHOD FOR GENERATING A VEHICLE SEE-THROUGH REAR VIEW IMAGE

CROSS-REFERENCE TO RELATED APPLICATIONS

This application is based on and claims priority to Japanese Patent Application No. 2019-087844, filed on May 7, 2019, the entire contents of which are incorporated herein by reference.

BACKGROUND OF THE INVENTION

1. Field of the Invention

The disclosures herein relate to an image processing apparatus, an image processing system, and an image processing method.

2. Description of the Related Art

In a camera monitoring system (CMS) installed in a vehicle such as a car, a method that provides a view as if a body of the vehicle were transparent (which will be hereinafter referred to as a see-through view) by combining a video image taken by a rear camera with a video image taken by a side camera on a vehicle portion of the video image taken by the side camera, is provided.

For example, a vehicle surroundings monitoring device that combines an image taken by a side camera imaging the rear with an image taken by a rear camera imaging the rear in a wide angle with converting a viewpoint based on distance information to a rear vehicle and displays the combined image, has been known (for example, see Patent Document 1).

In such a see-through view, it is preferable to combine an image taken by the side camera with an image taken by the wide-angle rear camera using three-dimensional information of the rear vehicle (for example, distances to multiple points on the rear vehicle) so as to combine images properly.

However, in the method disclosed in Patent Document 1, because a distance to the rear vehicle is measured based on the image taken by the side camera and the image taken by the rear camera, it is difficult to obtain the three-dimensional information of the rear vehicle when the rear vehicle enters a blind spot of the side camera.

In another method, a method for obtaining the three-dimensional information of the rear vehicle using a wide-angle camera that images the rear, such as a rear monitor for parking, and a normal camera, such as a monitor replacing a room monitor, can be considered. However, it is difficult to obtain the three-dimensional information of the entirety of the rear vehicle even using this method, because, for example, when the rear vehicle approaches very closely, a portion of the rear vehicle enters a blind spot of the normal camera.

As described, the method of the related art has a difficulty to combine the image taken by the side camera with the image taken by the rear camera using the three-dimensional information of the rear vehicle when the rear vehicle approaches very closely.

Such a problem is not limited to using the side camera and the rear camera, and commonly exists in an image processing system that combines an image taken by a first camera that includes a portion of the vehicle in the imaging range and an image taken by a second camera that images a blind spot of the first camera, using the three-dimensional information of the rear vehicle.

RELATED-ART DOCUMENTS

Patent Documents

Patent Document 1: Japanese Laid-Open Patent Publication No. 2016-175586

SUMMARY OF THE INVENTION

According to an embodiment of the present invention, an image processing apparatus includes a memory, and a processor coupled to the memory and configured to obtain an image taken by a first camera disposed on a vehicle such that an imaging range of the first camera includes a portion of a vehicle body of the vehicle and images taken by a second camera and a third camera that image an area of a blind spot caused by the portion of the vehicle body in the image taken by the first camera, combine a blind spot image corresponding to the area of the blind spot in the image taken by the second camera with the image taken by the first camera on the area of the blind spot of the image taken by the first camera, obtain three-dimensional information representing a shape of a rear vehicle with stereo vision of the second camera and the third camera, and store vehicle shape information of the rear vehicle when an entirety of the rear vehicle is within a range of the stereo vision, and wherein the processor determines three-dimensional information corresponding to a portion of the rear vehicle using the obtained three-dimensional information of the rear vehicle and the stored vehicle shape information when the portion of the rear vehicle is outside the range of the stereo vision, and combines the blind spot image with the image taken by the first camera on the area of the blind spot using the determined three-dimensional information.

DESCRIPTION OF THE EMBODIMENTS

In the following, embodiments of the present invention will be described with reference to the accompanying drawings.

<System Configuration>

Figure 1:
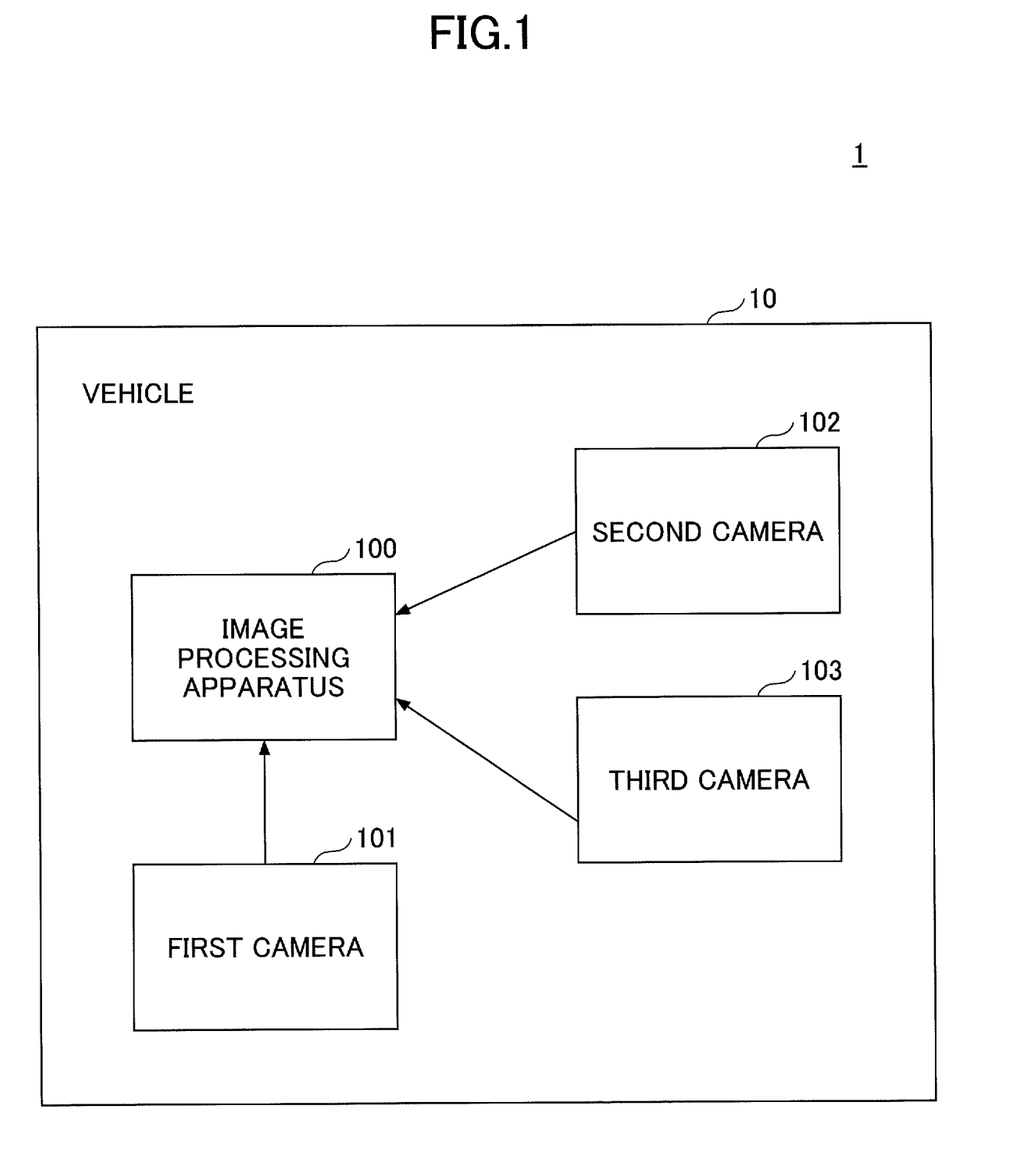
FIG. 1 is a drawing illustrating an example of a system configuration of an image processing system according to one embodiment.

FIG. 1 is a drawing illustrating an example of a system configuration of an image processing system according to one embodiment. In the example of FIG. 1, an image processing system 1 includes, for example, an image processing apparatus 100, a first camera 101, a second camera 102, and a third camera 103, which are installed in a vehicle 10 such as a car.

The image processing apparatus 100 is an information processing apparatus that achieves a camera monitoring system (CMS) installed in the vehicle 10 such as a car, for example. The image processing apparatus 100 may be an in-vehicle electronic control unit (ECU) that is pre-installed in the vehicle 10, or may be an information processing apparatus that can be post-installed in the vehicle 10.

The first camera 101 is a camera that is disposed such that a portion of a body of the vehicle 10 is included in the imaging range, that takes an image (or a video) behind the vehicle, and that outputs the image to the image processing apparatus. For example, the first camera 101 may be a side camera that is disposed at a side of the vehicle 10 as illustrated in FIG. 2A, and that takes a rear image 210 including a portion of a vehicle body 211 of the vehicle 10 as illustrated in FIG. 2B.

The second camera 102 and the third camera 103 are cameras that take an image (or a video) including an area being a blind spot caused by the portion of the vehicle body 211 (which will be hereinafter referred to as a blind area) in the rear image 210 taken by the first camera 101 and that output the image (or the video) to the image processing apparatus.

Figure 2A:
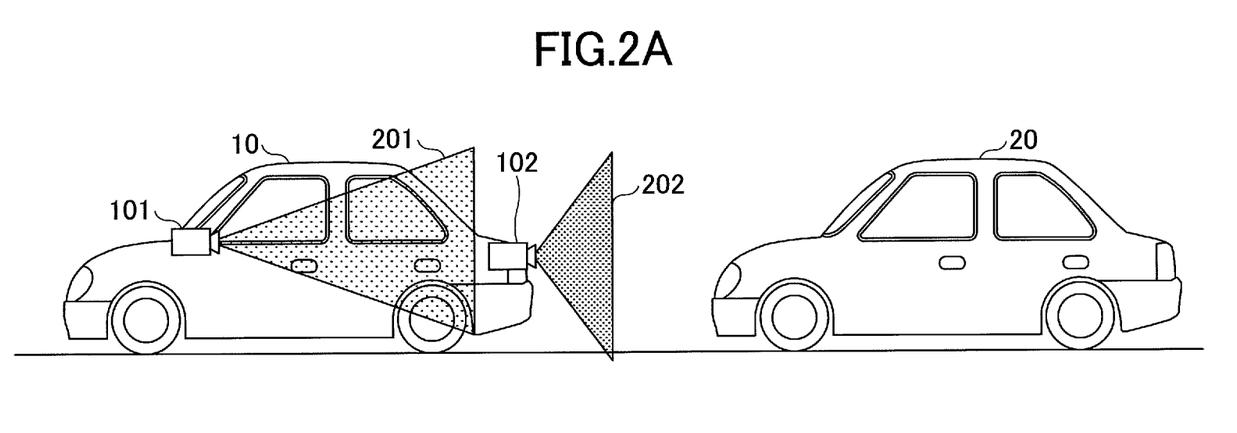
FIG. 2A, FIG. 2B, and FIG. 2C are first drawings for describing a see-through view using a virtual projection plane.
Figure 2B:
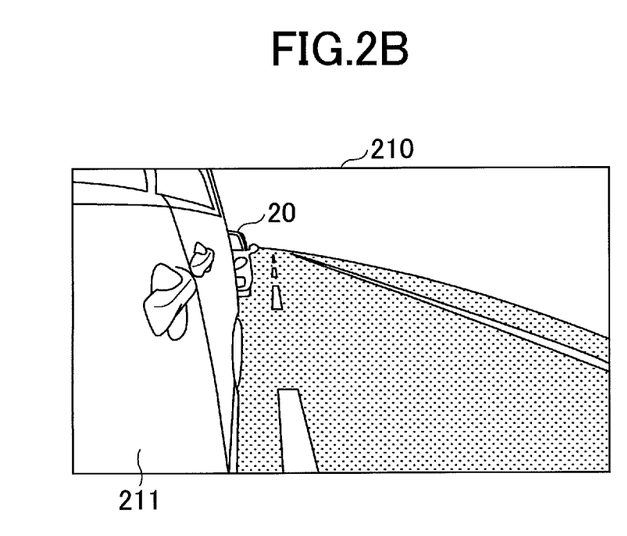
Figure 2C:
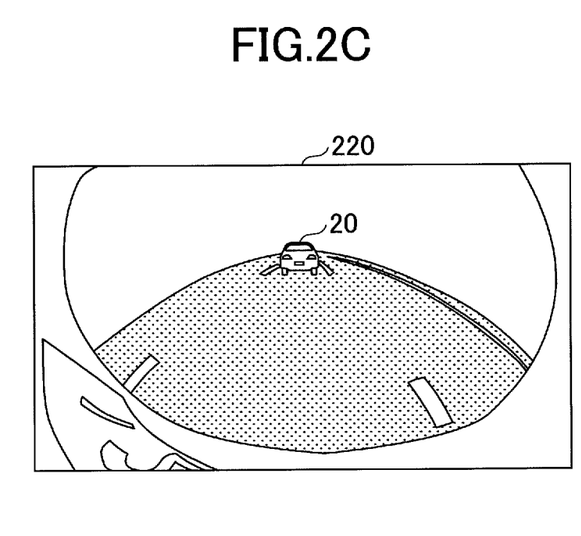

The second camera 102, for example, is disposed at the rear of the vehicle 10 as illustrated in FIG. 2A. To the second camera 102, a wide-angle camera or a fish-eye camera taking a rear image 220 at a wider angle of view than the first camera 101 can be applied, for example, as illustrated in FIG. 2C.

The third camera 103 is, for example, a camera that is disposed at the rear of the vehicle and that takes an image behind the vehicle 10 at a narrower angle of view than the second camera 102. To the third camera 103, a camera taking an image for replacing a rear-view mirror can be applied, for example. The third camera 103, for example, is disposed at a predetermined distance away from the second camera and is used to measure the distance with stereo vision using the image taken by the second camera and the image taken by the third camera.

The image processing apparatus 100 combines a blind spot image corresponding to the blind area in the image taken by the second camera 102 with the image taken by the first camera 101 on the blind area that is the blind spot caused by the portion of the vehicle body 211, and displays the combined image on the display device that displays the rear image. This enables the image processing apparatus 100 to achieve a see-through view that is a view as if the vehicle body were transparent by, for example, combining an image (or a video) of the rear camera with an image (or a video) of the side camera on the vehicle portion of the video of the side camera, in the camera monitoring system installed in the vehicle 10.

The system configuration of the image processing system 1 illustrated in FIG. 1 is an example. For example, at least some of the first camera 101, the second camera 102, and the third camera may be included in the image processing apparatus 100. Further, the side camera, the rear camera, and the camera replacing a rear-view mirror are examples of the first to third cameras, and the first to third cameras are not limited to these cameras.

<See-Through View Using a Virtual Projection Plane>

Before describing the see-through view according to the embodiment using the three-dimensional information, the see-through view using a virtual projection plane will be briefly described.

FIGS. 2A to 2C and FIGS. 3A to 3C are drawings for describing the see-through view using the virtual projection plane. As illustrated in FIG. 2A, it is assumed that the first camera 101 and the second camera 102 are disposed on the vehicle 10.

As an example, the first camera 101 is disposed at a position corresponding to a side mirror of the vehicle 10 as illustrated in FIG. 2A, and takes an image within an imaging range 201 similar to a general side mirror, as illustrated in FIG. 2B. The first camera 101 takes the rear image 210 including a portion of the vehicle body 211 of the vehicle 10 as illustrated in FIG. 2B, for example, and outputs the rear image 210 to the image processing apparatus 100.

As an example, the second camera 102 is disposed at the rear of the vehicle 10 as illustrated in FIG. 2A, and takes an image within an imaging range 202 that has a wider angle of view than the angle of view of the first camera 101 as illustrated in FIG. 2C. The second camera 102 takes the rear image 220 with a wider range that includes the blind area that is the blind spot caused by the portion of the vehicle body 211 in the rear image 210 taken by the first camera 101 as illustrated in FIG. 2C, and outputs the rear image 220 to the image processing apparatus 100.

Figure 3A:
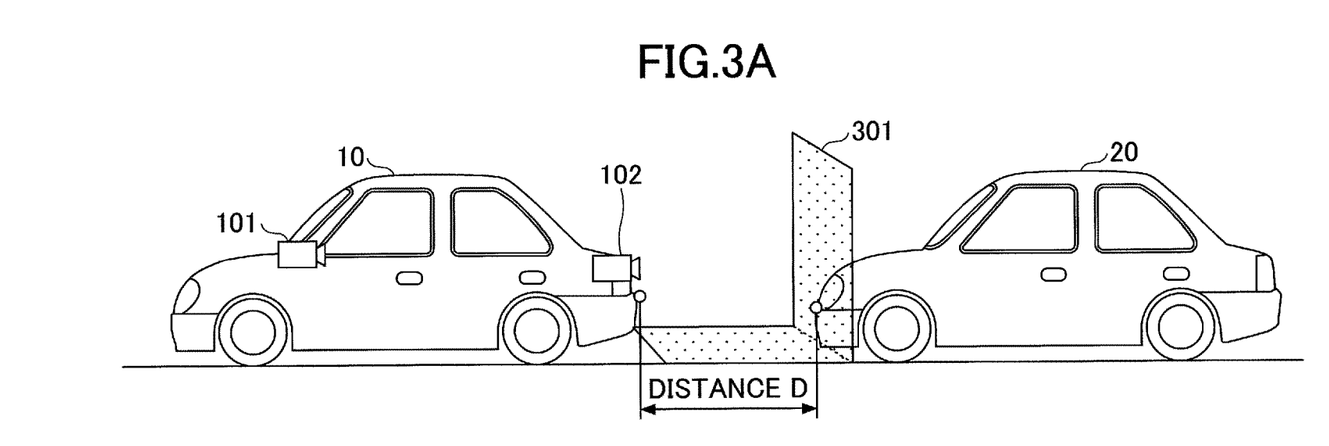
FIG. 3A, FIG. 3B, and FIG. 3C are second drawings for describing a see-through view using a virtual projection plane.

For example, the image processing apparatus 100 performs image recognition processing using the rear image 220 taken by the second camera 102 to detect the rear vehicle 20, and measures a distance d to the rear vehicle 20 as illustrated in FIG. 3A. For example, the image processing apparatus 100 measures the distance d to the rear vehicle 20 by stereo vision of the first camera 101 and the second camera 102, in a manner similar to the method disclosed in Patent Document 1.

The image processing apparatus 100 sets a virtual projection plane 301 at a position the distance d away from the vehicle 10 and projects an image 310 converted from the rear image 220 taken by the second camera 102 with changing a viewpoint of the rear image 220 to a viewpoint of the first camera 101, to the virtual projection plane 301.

Figure 3B:
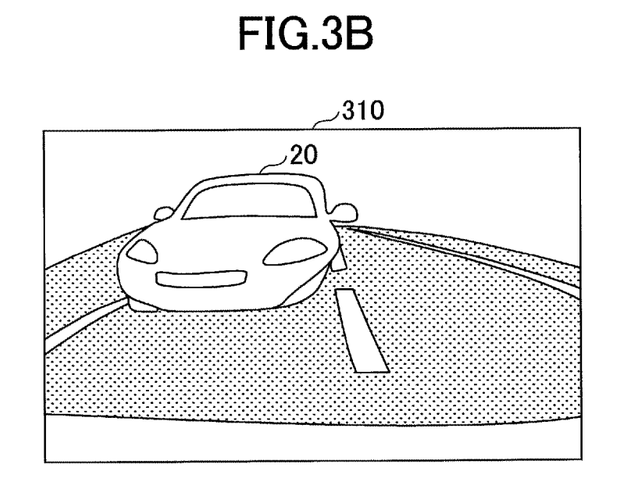
Figure 3C:
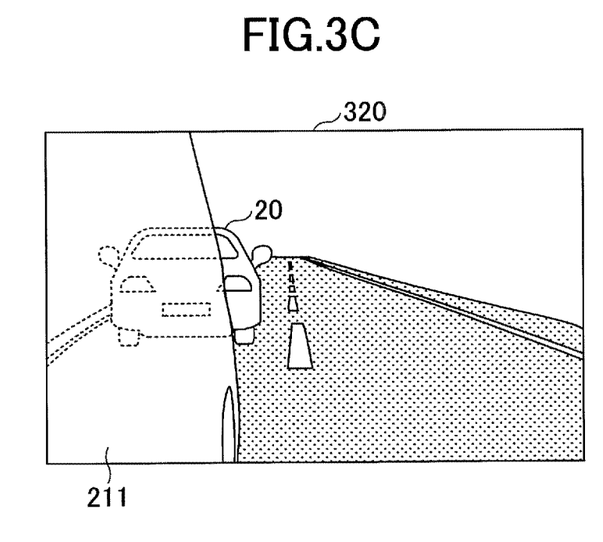

Further, the image processing apparatus 100 combines the image 310 projected to the virtual projection plane 301 as illustrated in FIG. 3B for example, with the rear image 210 taken by the first camera 101. This can generate a rear image 320 of the see-through view that provides a view as if the vehicle body were transparent, as illustrated in FIG. 3C for example. The generated rear image 320 is, for example, output and displayed on a dashboard of the vehicle 10, a display for displaying a rear image provided near an A-pillar, or the like.

This method can display the rear image 320 of the see-through view, as illustrated in FIG. 3C for example. However, the method can combine the image of the rear vehicle 20 taken by the second camera 102 with the image of the rear vehicle 20 taken by the first camera 101 correctly (or properly) only on the virtual projection plane 301 the distance d away from the vehicle 10, for example. As illustrated in FIG. 3A for example, when the virtual projection plane 301 is set at a center of a front grille of the rear vehicle 20, the distance to a hood, a windshield, a side, and the like of the vehicle 10 is further than the distance d. Thus, the image of the rear vehicle 20 may not be combined correctly (or properly).

Therefore, the embodiment obtains the three-dimensional information representing a shape of the rear vehicle 20 and combines the image of the rear vehicle 20 taken by the first camera 101 with the image of the rear vehicle 20 taken by the second camera 102 using the obtained three-dimensional information.

<See-Through View Using the Three-Dimensional Information>

Figure 4A:
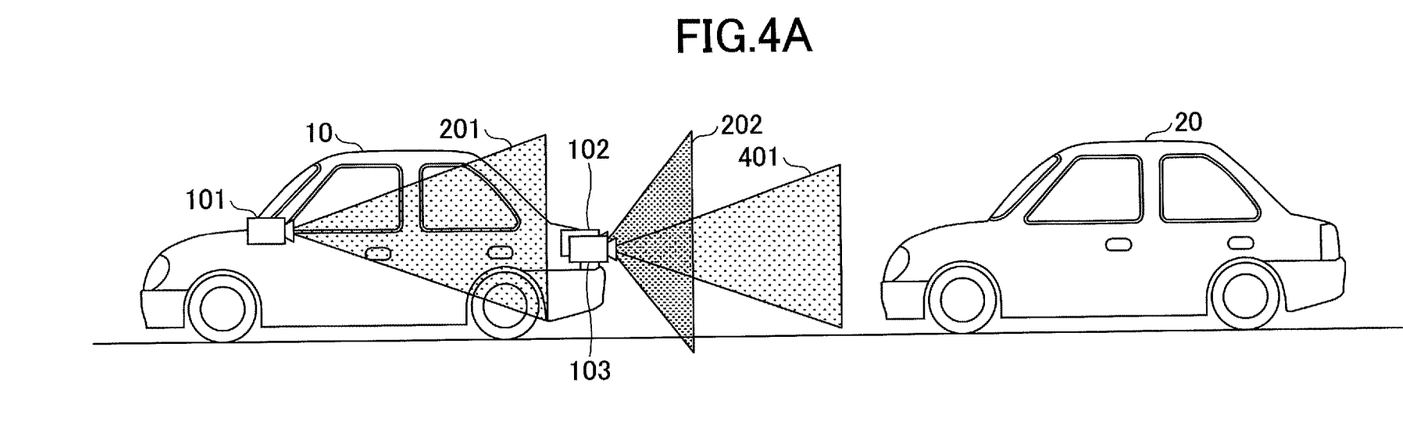
FIG. 4A and FIG. 4B are drawings for describing a see-through view according to one embodiment of the present invention.
Figure 4B:
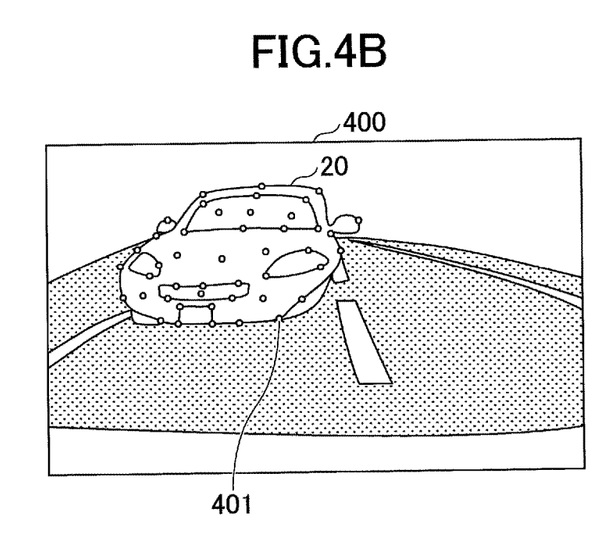

FIG. 4A, FIG. 4B, and FIG. 4C are drawings for describing the see-through view according to one embodiment of the present invention. In the embodiment, as illustrated in FIG. 4A for example, a third camera 103 is provided to the vehicle 10 in addition to the first camera 101 and the second camera 102.

The third camera 103 is, for example, installed a predetermined distance away from the second camera and is used to measure the distance to any given point on the rear vehicle 20 by stereo vision using the image taken by the second camera and the image taken by the third camera.

For example, the image processing apparatus 100 extracts multiple characteristic points from each of the image of the rear vehicle 20 taken by the second camera 102 and the image of the rear vehicle 20 taken by the third camera 103, as illustrated in FIG. 4B for example. The image processing apparatus 100 measures distances to multiple characteristic points that are common between the image of the rear vehicle 20 taken by the second camera 102 and the image of the rear vehicle 20 taken by the third camera 103 using a known triangulation principle.

Thus, for example, by disposing the second camera 102 and the third camera 103 at a predetermined interval at a rear end of the vehicle 10, the distances from the vehicle 10 to multiple characteristic points (which will be hereinafter referred to as multiple points) on the rear vehicle can be measured. It is not required that the second camera 102 and the third camera 103 are disposed at the rear end of the vehicle 10. The image processing apparatus 100 only requires to measure the distances from a given point on the vehicle 10 to multiple points on the rear vehicle 20.

In the embodiment, distance information from a given point on the vehicle 10 to multiple points on the rear vehicle 20 or three-dimensional coordinate information determined based on the distance information to the multiple points is called three-dimensional information of the rear vehicle 20.

The three-dimensional information of the rear vehicle 20 enables the image processing apparatus 100 to grasp a shape of the rear vehicle 20. Additionally, the image processing apparatus 100 can project the rear image 220 taken by the second camera 102 and the rear image 210 taken by the first camera 101 to the same plane using the three-dimensional information of the rear vehicle 20 to perform any coordinate transformation such as enlargement, reduction, and rotation.

For example, in the see-through view using the virtual projection plane described in FIGS. 2A to 2C and FIGS. 3A to 3C, the image of the rear vehicle 20 taken by the first camera 101 and the image of the rear vehicle 20 taken by the second camera 102 can be correctly (or properly) combined only on the virtual projection plane 301. With respect to this, in the see-through view using the three-dimensional information according to the embodiment, the image of the rear vehicle 20 taken by the first camera 101 and the image of the rear vehicle 20 taken by the second camera 102 can be correctly combined at multiple points on the rear vehicle 20.

Problem to be Solved

Figure 5:
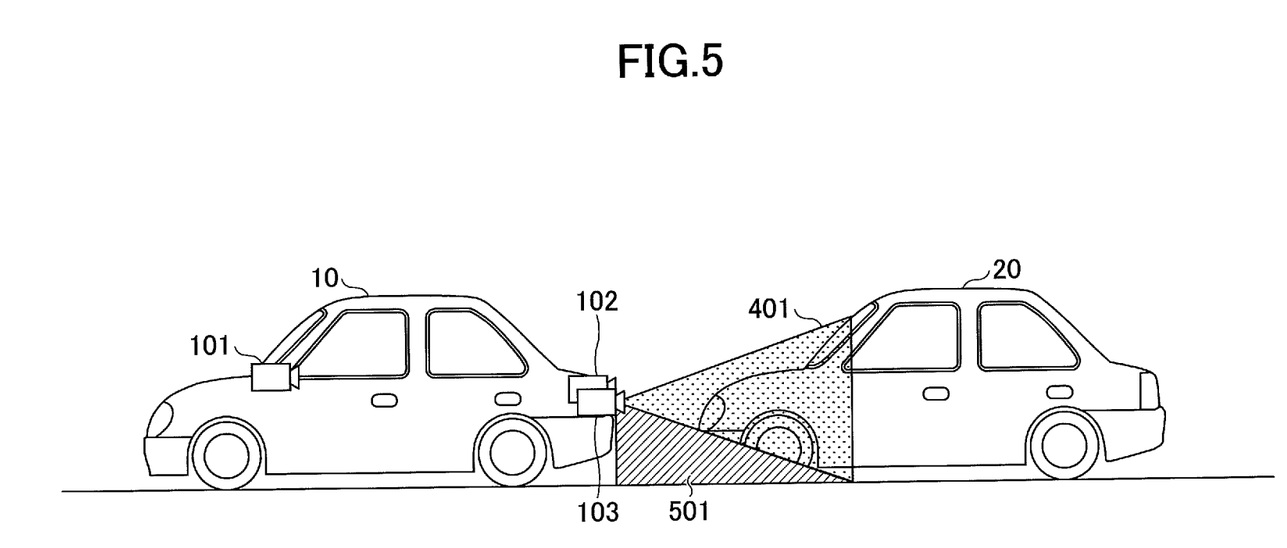
FIG. 5 is a drawing for describing a problem of a see-through view using three-dimensional information.

FIG. 5 is a drawing for describing a problem of the see-through view using three-dimensional information. As illustrated in FIG. 5, a portion of the rear vehicle 20 may enter a blind spot 501 of the third camera 103 when the rear vehicle 20 approaches in close proximity to the vehicle 10. In this case, the image processing apparatus 100 cannot obtain the three-dimensional information of the portion of the rear vehicle 20 that enters the blind spot 501 of the third camera 103, in the three-dimensional information on the rear vehicle 20. Therefore, combining the image of the rear vehicle taken by the first camera 101 with the image of the rear vehicle 20 taken by the second camera 102, the image processing apparatus 100 may not be able to combine the portion that has entered the blind spot 501 of the third camera 103 correctly.

<Overview of a Process of the Image Processing Apparatus>

Figure 6A:
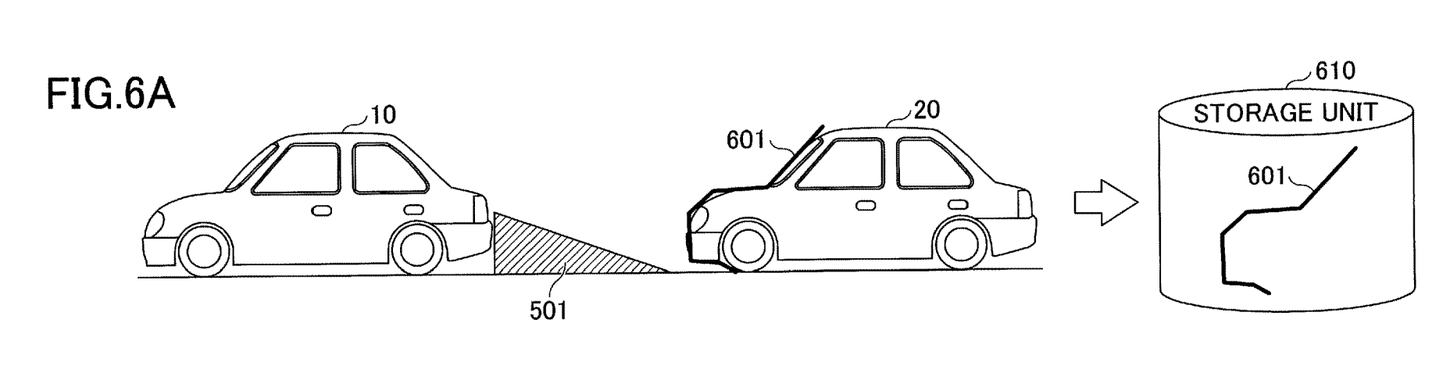
FIG. 6A, FIG. 6B, and FIG. 6C are drawings for describing an overview of a process of an image processing apparatus according to one embodiment.
Figures 6B, 6C:
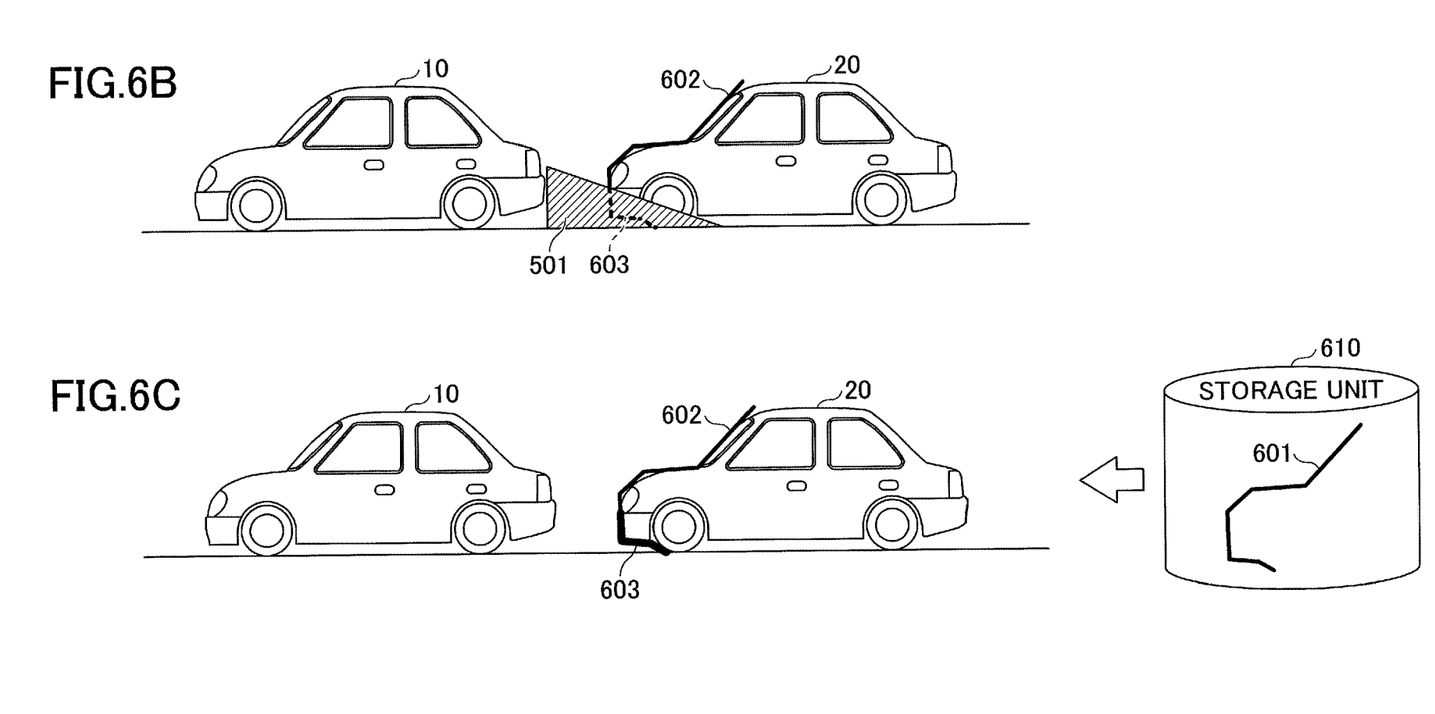

FIG. 6A, FIG. 6B, and FIG. 6C are drawings for describing an overview of a process of the image processing apparatus according to one embodiment.

As illustrated in FIG. 6A, when the rear vehicle 20 does not enter the blind spot 501 of the third camera 103, the image processing apparatus 100 can obtain the three-dimensional information of the entirety of the rear vehicle 20 with stereo vision of the second camera 102 and the third camera 103. At this time, the image processing apparatus 100 stores the obtained three-dimensional information of the entirety of the rear vehicle 20 in, for example, a storage unit 610 of the image processing apparatus 100 as vehicle shape information 601.

As illustrated in FIG. 6B, when the rear vehicle 20 enters the blind spot 501 of the third camera 103, the image processing apparatus 100 obtains three-dimensional information 602 of the rear vehicle 20 with stereo vision of the second camera 102 and the third camera 103. However, in this case, the image processing apparatus 100 cannot obtain three-dimensional information 603 of the portion of the rear vehicle 20 that has entered the blind spot 501 of the third camera 103, in the three-dimensional information of the rear vehicle 20.

In this case, the image processing apparatus 100 determines the three-dimensional information 603 of the portion of the rear vehicle that has entered the blind spot 501 of the third camera 103 using the obtained three-dimensional information 602 of the rear vehicle 20 and the vehicle shape information 601 of the rear vehicle 20 stored in the storage unit 610.

For example, the coordinate transformation, such as enlargement, reduction, and rotation, can be applied to the vehicle shape information 601 of the rear vehicle 20 stored in the storage unit 610 in a manner similar to the three-dimensional information of the rear vehicle 20 described above. Thus, the image processing apparatus 100 can determine the three-dimensional information 603 of the portion of the rear vehicle 20 with performing the coordinate transformation on the vehicle shape information 601 stored in the storage unit 610 in accordance with the obtained three-dimensional information 602 of the rear vehicle, for example.

The image processing apparatus 100 can convert the rear image 220 taken by the second camera 102 with changing the viewpoint of the rear image 220 to the viewpoint of the first camera 101 using the obtained three-dimensional information 602 of the rear vehicle 20 and the determined three-dimensional information 603 of the portion of the rear vehicle 20.

As described above, even when the rear vehicle 20 approaches very closely, the embodiment facilitates combining the rear image 210 taken by the first camera 101 with the rear image 220 taken by the second camera 102 using the three-dimensional information of the rear vehicle 20.

<Hardware Configuration>

Here, an example of a hardware configuration of the image processing apparatus 100 will be described.

Figure 7:
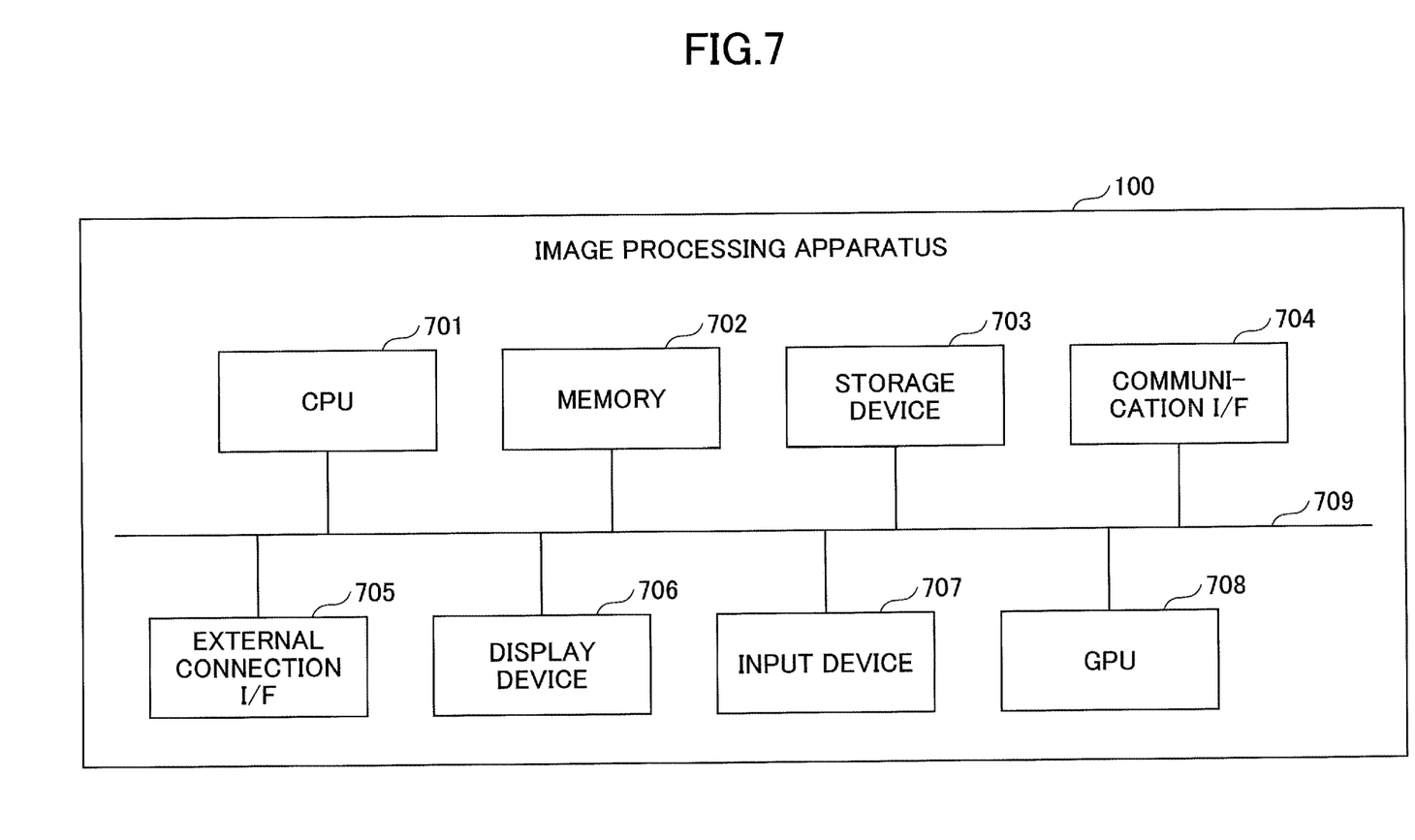
FIG. 7 is a drawing illustrating an example of a hardware configuration of the image processing apparatus according to one embodiment.

FIG. 7 is a drawing illustrating an example of the hardware configuration of the image processing apparatus according to one embodiment. The image processing apparatus 100 includes a general computer configuration including, for example, a central processing unit (CPU) 701, a memory 702, a storage device 703, a communication interface (I/F) 704, an external connection I/F 705, a display device 706, an input device 707, a graphics processing unit (GPU) 708, and a system bus 709.

The CPU 701 is an arithmetic device that executes each function of the image processing apparatus 100 with, for example, executing a program stored in the storage device 703 and the memory 702. The memory 702 includes, for example, a random access memory (RAM), which is a volatile memory used as a work area of the CPU 701, and a ROM (Read Only Memory), which is a non-volatile memory storing a program for starting the image processing apparatus 100.

The storage device 703 is, for example, a large storage device storing an operating system (OS), an application program, and various types of data, which is implemented by a hard disk drive (HDD) or a solid state drive (SSD) for example.

The communication I/F 704 is an interface for communicating with an external device. For example, the communication I/F 704 connects the image processing apparatus 100 to an in-vehicle network and enables the image processing apparatus 100 to communicate with one or more ECUs, cameras, and so on, which are installed in the vehicle 10. Additionally, the communication I/F 704 may be an interface that enables the image processing apparatus 100 to communicate with an external device through a wireless local area network (LAN), a short distance wireless communication, and so on.

The external connection I/F 705 is an interface for connecting the external device to the image processing apparatus 100. The external connection I/F 705 may include, for example, an interface for connecting the first to third cameras to the image processing apparatus 100, an interface for connecting the display device for displaying a rear image, and an interface for connecting an external storage device.

The display device 706 may include, for example, a display for displaying the rear image combined by the image processing apparatus 100, and a display device such as a light emitting diode (LED) that displays information such as an operation state and an alarm. The input device 707 may include a touch panel for receiving user input operations, an operation button, and a power button.

The GPU 708 is an arithmetic device that mainly performs an operation related to image processing among processes performed by the image processing apparatus 100. The image processing apparatus 100 may perform image processing with the CPU 701. In this case, the image processing apparatus 100 may not include the GPU 708.

The system bus 709 is connected to each of the above-described components and transmits, for example, an address signal, a data signal, and various control signals. The hardware configuration of the image processing apparatus 100 illustrated in FIG. 7 is an example, and the image processing apparatus 100 may be various hardware configurations including a computer configuration.

<Functional Configuration>

Figure 8:
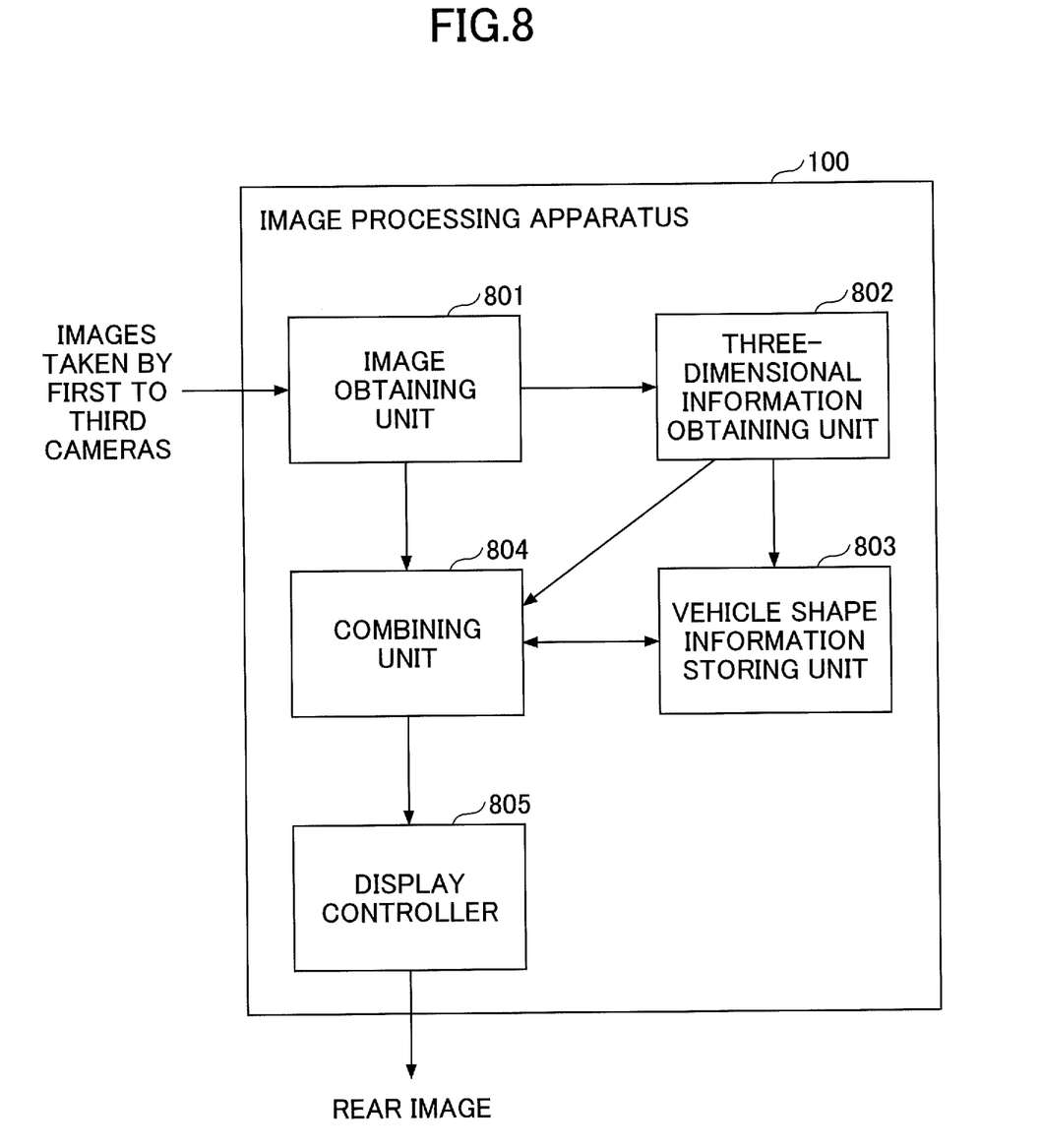
FIG. 8 is a drawing illustrating an example of a functional configuration of the image processing apparatus according to one embodiment.

Next, a functional configuration of the image processing apparatus 100 will be described. FIG. 8 is a drawing illustrating an example of a functional configuration of the image processing apparatus according to one embodiment. The image processing apparatus 100 includes, for example, an image obtaining unit 801, a three-dimensional information obtaining unit 802, a vehicle shape information storing unit 803, a combining unit 804, and a display controller 805.

The image obtaining unit 801, for example, is achieved by a program executed by the CPU 701 of FIG. 7, and continuously obtains the rear image 210 taken by the first camera 101, the rear image 220 taken by the second camera 102, and the image (or the video) taken by the third camera 103. The image obtaining unit 801 obtains images output from the first to third cameras using the external connection I/F 705 or the communication I/F 704 illustrated in FIG. 7, for example.

The three-dimensional information obtaining unit 802, for example, is achieved by a program executed by the CPU 701 of FIG. 7, and is achieved by the GPU 708 of FIG. 7. The three-dimensional information obtaining unit 802 obtains the three-dimensional information of the rear vehicle 20 using stereo vision of the second camera 102 and the third camera 103. For example, the three-dimensional information obtaining unit 802 measures distances to multiple points (i.e., characteristic points) on the rear vehicle 20 with a known stereo matching using the image taken by the second camera 102 and the image taken by the third camera 103. The three-dimensional information obtaining unit 802 obtains the distance information to the multiple points on the rear vehicle 20 or three-dimensional coordinate information determined based on the distance information to the multiple points, as the three-dimensional information of the rear vehicle 20.

The vehicle shape information storing unit (i.e., the storing unit) 803, for example, is achieved by a program executed by the CPU 701 of FIG. 7. When the entirety of the rear vehicle 20 is within the range of the stereo vision of the second camera 102 and the third camera 103, the vehicle shape information storing unit 803 stores the vehicle shape information 601 of the rear vehicle 20 in, for example, the storage unit 610 such as the memory 702 and the storage device 703 illustrated in FIG. 7.

For example, as described in FIG. 6A, when the rear vehicle 20 does not enter the blind spot 501 of the third camera 103, the three-dimensional information obtaining unit 802 can obtain three-dimensional information of the entirety of the rear vehicle 20 by stereo vision of the second camera 102 and the third camera 103. In this case, the vehicle shape information storing unit 803 determines that the entirety of the rear vehicle 20 is within the range of stereo vision of the second camera 102 and the third camera 103, and temporarily stores the obtained three-dimensional information of the entirety of the rear vehicle 20 as the vehicle shape information 601 in the storage unit 610.

The combining unit 804, for example, is achieved by a program executed by the CPU 701 of FIG. 7, and is achieved by the GPU 708 of FIG. 7. The combining unit 804 combines the blind spot image corresponding to the blind spot in the rear image 220 taken by the second camera 102 with the rear image 210 taken by the first camera 101 on an area of the blind spot of the rear image 210.

When the entirety of the rear vehicle 20 is within the range of the stereo vision for example, the combining unit 804 converts the rear image 220 taken by the second camera 102 with a coordinate transformation (i.e., a viewpoint conversion) to a viewpoint of the first camera 101 using the three-dimensional information of the entirety of the rear vehicle 20 obtained by the three-dimensional information obtaining unit 802. The combining unit 804 combines the blind spot image in the converted image corresponding to the blind spot with the rear image 210 taken by the first camera 101 on the blind area that is the blind spot caused by the vehicle body 211, and generates, for example, the rear image 320 of the see-through view as illustrated in FIG. 3C.

When a portion of the rear vehicle 20 is outside the range of stereo view, the combining unit 804 determines the three-dimensional information 603 of the portion of the rear vehicle 20 using the obtained three-dimensional information 602 of the rear vehicle 20 and the stored vehicle shape information 601 of the rear vehicle 20, as described above in FIG. 6C.

For example, the coordinate transformation, such as enlargement, reduction, and rotation, can be applied to the vehicle shape information 601 of the rear vehicle 20 stored in the vehicle shape information storing unit 803 in a manner similar to the three-dimensional information of the rear vehicle 20 described above. Thus, the combining unit 804, for example, can determine the three-dimensional information 603 of the portion of the rear vehicle 20 with the coordinate transformation of the vehicle shape information 601 stored in the vehicle shape information storing unit 803 in accordance with the orientation and the size of the obtained three-dimensional information 602 of the rear vehicle.

The combining unit 804 uses the obtained three-dimensional information 602 of the rear vehicle 20 and the determined three-dimensional information 603 of the portion of the rear vehicle to convert the rear image 220 taken by the second camera 102 with changing the viewpoint of the rear image 220 to the viewpoint of the first camera 101 (i.e., viewpoint conversion). The combining unit 804 combines the blind spot image corresponding to the blind spot in the converted image with the rear image 210 taken by the first camera 101 on the blind area that is the blind spot caused by the vehicle body 211 and generates the rear image 320 of the see-through view, for example, as illustrated in FIG. 3C.

The display controller 805, for example, is achieved by a program executed by the CPU 701 of FIG. 7, and outputs the rear image 320 generated by the combining unit 804 to the display device displaying the rear image, and causes the display device to display the rear image 320.

<Process Flow>

Next, a flow of a process of the image processing method by the image processing system 1 according to the embodiment will be described.

(Process of the Image Processing Apparatus)

Figure 9:
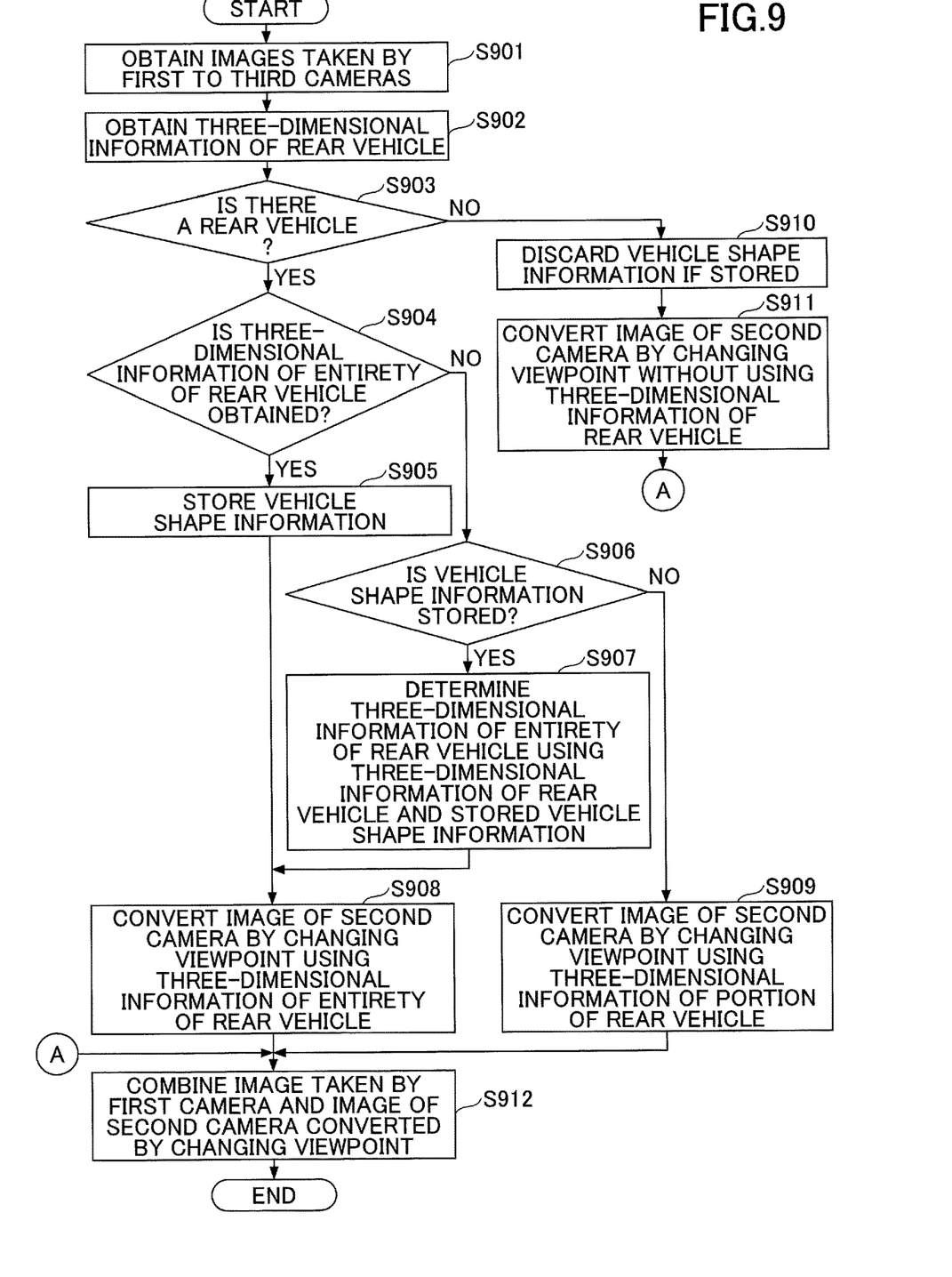
FIG. 9 is a flowchart illustrating an example of a process of the image processing apparatus according to one embodiment.

FIG. 9 is a flowchart illustrating an example of a process of the image processing apparatus according to one embodiment. The process illustrates an example of a process that the image processing apparatus 100 repeatedly performs while the vehicle 10 travels. While the process is being performed, it is assumed that the first camera 101 continuously takes and outputs the rear image 210 (or the video) as illustrated in FIG. 2B.

Additionally, it is assumed that the second camera 102 continuously takes and outputs the rear image 220 (or the video) as illustrated in FIG. 2C. Further, it is assumed that the third camera 103 continuously takes and outputs the rear image (or the video) of the vehicle 10 at a narrower angle of view than the second camera 102.

In step S901, the image obtaining unit 801 obtains the images taken by the first to third cameras.

In step S902, the three-dimensional information obtaining unit 802 obtains the three-dimensional information of the rear vehicle 20 at the rear of the vehicle 10 with stereo vision of the second camera 102 and the third camera 103. Here, the process of obtaining the three-dimensional information by the three-dimensional information obtaining unit 802 will be described in detail in FIG. 10.

In step S903, the image processing apparatus 100 determines whether there is a rear vehicle 20. For example, the image processing apparatus 100 may determine that the rear vehicle 20 is present when the three-dimensional information obtaining unit 802 could obtain three-dimensional information of the rear vehicle 20, and may determine that there is no rear vehicle 20 when the three-dimensional information obtaining unit 802 could not obtain three-dimensional information of a rear vehicle 20.

When there is the rear vehicle 20, the image processing apparatus 100 moves the process to step S904. When there is no rear vehicle 20, the image processing apparatus 100 moves the process to step S910.

When the process moves to step S904, the vehicle shape information storing unit 803 determines whether the three-dimensional information obtaining unit 802 can obtain the three-dimensional information of the entirety of the rear vehicle 20.

When the three-dimensional information of the entirety of the rear vehicle 20 can be obtained, the vehicle shape information storing unit 803 determines that the entirety of the rear vehicle 20 is within the range of stereo vision of the second camera 102 and the third camera 103 and moves the process to step S905. When the three-dimensional information of the entirety of the rear vehicle 20 cannot be obtained, the vehicle shape information storing unit 803 determines that a portion of the rear vehicle 20 is outside the range of the stereo vision of the second camera 102 and the third camera 103 for example, and moves the process to step S906.

When the process proceeds to step S905, the vehicle shape information storing unit 803 stores the three-dimensional information of the rear vehicle 20 obtained by the three-dimensional information obtaining unit 802 in the storage unit 610, such as the memory 702 and the storage device 703, as the vehicle shape information 601 of the rear vehicle 20.

When the process proceeds from step S904 to step S906, the image processing apparatus 100 determines whether the vehicle shape information 601 of the rear vehicle 20 is stored by the vehicle shape information storing unit 803.

When the vehicle shape information 601 is stored, the image processing apparatus 100 moves the process to step S907. When the vehicle shape information 601 is not stored, the image processing apparatus 100 moves the process to step S909.

When the process proceeds to step S907, the combining unit 804 determines (or estimates) the three-dimensional information of the entirety of the rear vehicle 20 based on the three-dimensional information of the rear vehicle 20 obtained by the three-dimensional information obtaining unit 802 and the vehicle shape information stored by the vehicle shape information storing unit 803.

For example, the combining unit 804 determines the three-dimensional information 603 of a portion of the rear vehicle 20 that has entered the blind spot 501 as illustrated in FIG. 6B and that could not be obtained, using the obtained three-dimensional information 602 of the rear vehicle 20 and the stored vehicle shape information 601 of the rear vehicle 20. The combining unit 804 also combines the obtained three-dimensional information 602 of the rear vehicle 20 with the determined three-dimensional information 603 of the portion of the rear vehicle 20 to determine the three-dimensional information of the entirety of the rear vehicle 20.

Alternatively, the combining unit 804 may match the stored vehicle shape information 601 of the rear vehicle 20 with the obtained three-dimensional information 602 of the rear vehicle 20 with respect to the orientation, the size, and so on by enlargement, reduction, and rotation to determine the three-dimensional information of the entirety of the rear vehicle 20.

When the process proceeds from step S905 or step S907 to step S908, the combining unit 804 converts the image taken by the second camera 102 with changing the viewpoint of the image to the viewpoint of the first camera 101 (i.e., the coordinate transformation) using the three-dimensional information of the entirety of the rear vehicle 20.

When the process proceeds from step S906 to step S909, the combining unit 804 converts the image taken by the second camera 102 with a coordinate transformation to the viewpoint of the first camera 101 (i.e., the viewpoint conversion) using the three-dimensional information of the portion of the rear vehicle 20 obtained in step S902.

When the process proceeds from step S903 to step S910, the vehicle shape information storing unit 803 discards the vehicle shape information if stored. In step S911, the combining unit 804 converts the image taken by the second camera 102 with a coordinate transformation to the viewpoint of the first camera 101 (i.e., the viewpoint conversion) without using the three-dimensional information of the rear vehicle 20.

In step S912, the combining unit 804 combines the image taken by the first camera with the image of the second camera 102 that has been converted with respect to the viewpoint in steps S908, S909, or S911, and generates, for example, the rear image 320 of the see-through view as illustrated in FIG. 3C. The display controller 805 outputs the rear image 320 generated by the combining unit 804 to the display device that displays the rear image of the vehicle 10 and causes the display device to display the rear image 320.

As illustrated in FIG. 6A and FIG. 6B, before the rear vehicle 20 approaches the vehicle 10 very closely, it is considered that the three-dimensional information of the entirety of the rear vehicle 20 can be obtained in many cases. Thus, by repeatedly performing the process illustrated in FIG. 9, the image processing apparatus 100 can easily combine the image taken by the first camera 101 and the image taken by the second camera 102 using the three-dimensional information of the rear vehicle 20 even when the rear vehicle 20 approaches very closely.

(Process of Obtaining the Three-Dimensional Information)

Figure 10:
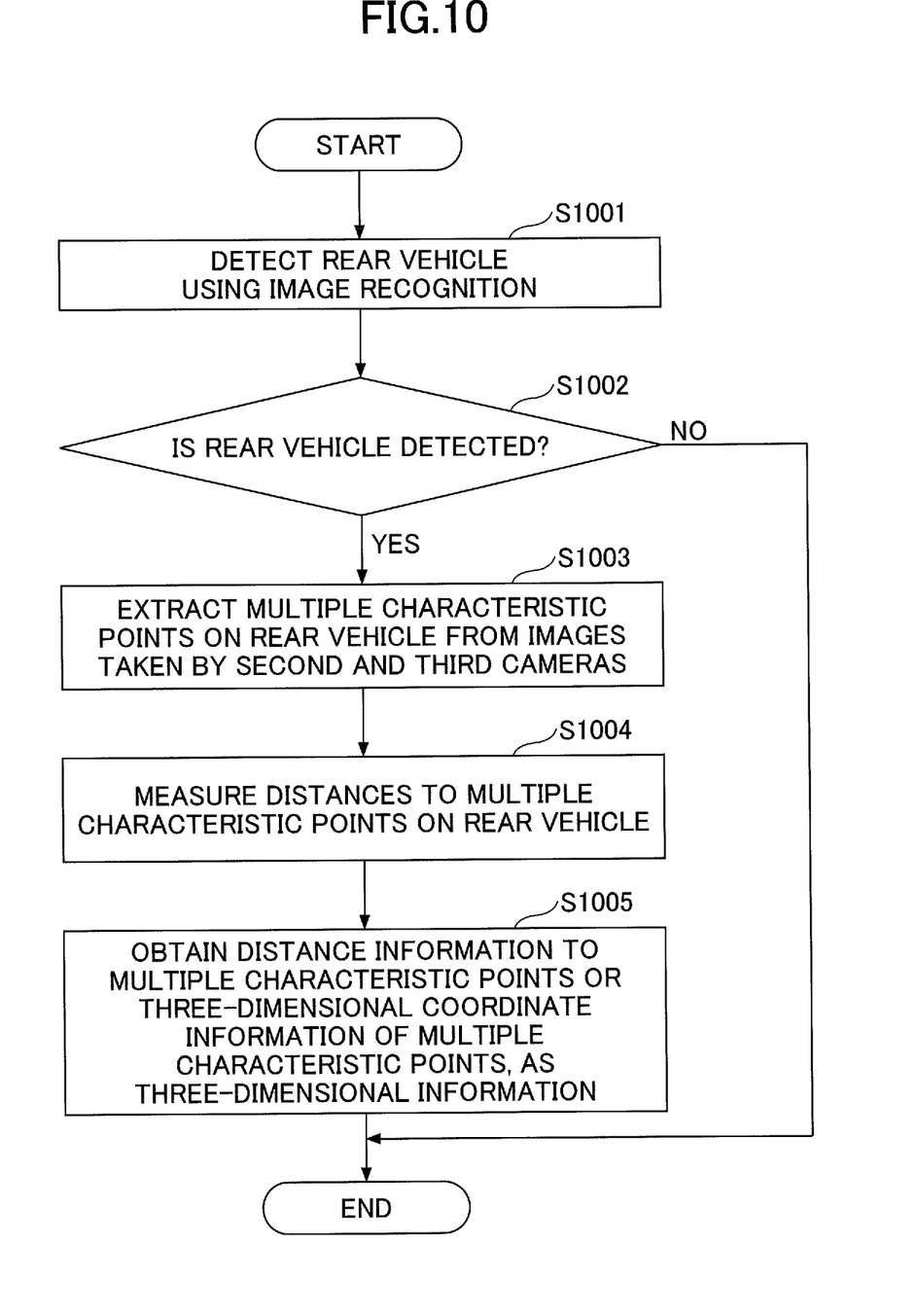
FIG. 10 is a flowchart illustrating an example of a process of obtaining the three-dimensional information according to one embodiment.

FIG. 10 is a flowchart illustrating an example of a process of obtaining the three-dimensional information according to one embodiment. The process illustrates an example of the process of obtaining the three-dimensional information performed by the three-dimensional information obtaining unit 802 in step S902 of FIG. 9.

In step S1001, the three-dimensional information obtaining unit 802 detects the rear vehicle 20 with image recognition using the image taken by the second camera 102 or the image taken by the third camera 103.

In step S1002, when the three-dimensional information obtaining unit 802 detects the rear vehicle 20, the three-dimensional information obtaining unit 802 performs the process as of step S1003. When the three-dimensional information obtaining unit 802 cannot detect the rear vehicle 20, the three-dimensional information obtaining unit 802 does not perform the process as of step S1003.

In step S1003, the three-dimensional information obtaining unit 802 extracts multiple characteristic points from each of the image of the rear vehicle 20 taken by the second camera 102 and the image of the rear vehicle 20 taken by the third camera 103, for example, as illustrated in FIG. 4B.

In step S1004, the three-dimensional information obtaining unit 802 measures distances to multiple characteristic points that are common between the image of the rear vehicle 20 taken by the second camera 102 and the image of the rear vehicle 20 taken by the third camera 103 using stereo vision.

In step S1005, the three-dimensional information obtaining unit 802 obtains measured distance information to multiple characteristic points or three-dimensional coordinate information based on the distance information to multiple characteristic points, as the three-dimensional information of the rear vehicle 20.

With the above-described process, the image processing apparatus 100 can obtain the three-dimensional information representing the shape of the rear vehicle 20 using the image taken by the second camera 102 and the image taken by the third camera 103.

When the entirety of the rear vehicle 20 is within the range of stereo vision of the second camera 102 and the third camera 103, the image processing apparatus 100 can obtain the vehicle shape information representing the vehicle shape of the rear vehicle 20 with obtaining the three-dimensional information of the rear vehicle 20.

Furthermore, when a portion of the rear vehicle 20 has entered the blind spot 501 of the third camera 103, the image processing apparatus 100 can use the vehicle shape information to determine (or estimate) the three-dimensional information corresponding to the portion of the rear vehicle 20 that has entered the blind spot 501.

Therefore, even when the rear vehicle 20 approaches very closely, the image processing apparatus 100 according to the embodiment facilitates combining the image taken by the first camera 101 with the image taken by the second camera 102 using the three-dimensional information of the rear vehicle 20.

One embodiment of the present invention has been described above, but the present invention is not limited to the embodiment described above. The various modifications and alterations can be made within the spirit and scope of the invention described in the claim.

What is claimed is:

1. An image processing apparatus comprising:
  a memory; and
  a processor coupled to the memory and configured to
    obtain a first image taken by a first camera disposed on a vehicle such that an imaging range of the first camera includes a portion of a vehicle body of the vehicle and a second image taken by a second camera and a third image taken by a third camera that image an area of a blind spot caused by the portion of the vehicle body in the image taken by the first camera, the first image including a portion of the first vehicle, and the second image and the third image each including a first region corresponding to a blind spot within the first image caused by the portion of the first vehicle, combine the first image with the first region in the second image to compensate for the blind spot, continue to obtain, successively, first data with use of the second image and the third image, the first data representing three-dimensional coordinate information of a second vehicle, and store second data to the memory when the first data includes an entire view of the second vehicle, the second data representing a three-dimensional shape of the second vehicle, wherein the processor, when three-dimensional information corresponding to a portion of the second vehicle is missing in the first data, determine the missing three-dimensional information by using the first data and the stored second data and generate three-dimensional coordinate information of the second vehicle.

2. The image processing apparatus as claimed in claim 1, wherein, when the portion of the second vehicle is missing in the first data, the processor combines the second image with the first image, with changing a viewpoint of the second image to a viewpoint of the first image by using the first data and the determined missing three-dimensional information.

3. The image processing apparatus as claimed in claim 1, wherein the three-dimensional information of the second vehicle includes distance information to a plurality of points on the second vehicle, or three-dimensional coordinate information of the plurality of points based on the distance information to the plurality of points.

4. The image processing apparatus as claimed in claim 3, wherein the second information includes the three-dimensional information of the second vehicle obtained when the first data includes the entire view of the second vehicle.

5. The image processing apparatus as claimed in claim 1, comprising a display controller configured to cause a display device to display an image combined by the processor, the display device displaying a rear image of the first vehicle.

6. The image processing apparatus as claimed in claim 1, wherein the first camera is a camera imaging an area behind the vehicle from a side of the vehicle, the second camera is a wide-angle camera imaging the area behind the vehicle from a rear of the vehicle, and the third camera is a camera imaging the area behind the vehicle from the rear of the vehicle at an angle narrower than the second camera.

7. An image processing system comprising:

a first camera disposed on a first vehicle such that an imaging range of the first camera includes a portion of a vehicle body of the first vehicle;

a second camera and a third camera that image an area of a blind spot caused by the portion of the vehicle body in the image taken by the first camera; and an image processing apparatus configured to combine a blind spot image corresponding to the area of the blind spot in the image taken by the second camera with the image taken by the first camera on the area of the blind spot of the image taken by the first camera, wherein the image processing apparatus includes a memory, and a processor coupled to the memory and configured to continue to obtain, successively, first data with use of the second image and the third image, the first data representing three-dimensional coordinate information of a second vehicle, store second data to the memory when the first data includes an entire view of the second vehicle, the second data representing a three-dimensional shape of the second vehicle, determine, when three-dimensional information corresponding to a portion of the second vehicle is missing in the first data, the missing three-dimensional information by using the first data and the stored second data and generate three-dimensional coordinate information of the second vehicle, and combine the blind spot image with the image taken by the first camera on the area of the blind spot using the determined missing three-dimensional information.

8. An image processing method comprising:

obtaining a first image taken by a first camera disposed on a vehicle such that an imaging range of the first camera includes a portion of a vehicle body of the vehicle and a second image taken by a second camera and a third image taken by a third camera that image an area of a blind spot caused by the portion of the vehicle body in the image taken by the first camera, the first image including a portion of the first vehicle, and the second image and the third image each including a first region corresponding to a blind spot within the first image caused by the portion of the first vehicle;

combining the first image with the first region in the second image to compensate for the blind spot;

continuing to obtain, successively, first data with use of the second image and the third image, the first data representing three-dimensional coordinate information of a second vehicle;

storing second data to the memory when the first data includes an entire view of the second vehicle, the second data representing a three-dimensional shape of the second vehicle; and determining, when three-dimensional information corresponding to a portion of the second vehicle is missing in the first data, the missing three-dimensional information by using the first data and the stored second data and generating three-dimensional coordinate information of the second vehicle.

* * * * *